United States Patent [19]

Kaihori et al.

[11] Patent Number: 5,528,013

[45] Date of Patent: Jun. 18, 1996

[54] METHOD OF AUTOMATICALLY ADJUSTING WELDING CONDITIONS FOR AN ARC WELDING ROBOT

[75] Inventors: Hirotsugu Kaihori, Yamanashi; Kyozi Iwasaki, Hachioji, both of Japan

[73] Assignee: Fanuc Ltd., Minamitsuru-gun, Japan

[21] Appl. No.: 347,489

[22] PCT Filed: Apr. 7, 1994

[86] PCT No.: PCT/JP94/00589

§ 371 Date: Feb. 23, 1995

§ 102(e) Date: Feb. 23, 1995

[87] PCT Pub. No.: WO94/23882

PCT Pub. Date: Oct. 27, 1994

[30] Foreign Application Priority Data

Apr. 13, 1993 [JP] Japan ................................. 5-108783

[51] Int. Cl.$^6$ ................................................ B23K 9/095
[52] U.S. Cl. ...................... 219/130.5; 219/130.32; 901/42
[58] Field of Search .................... 219/130.32, 130.5, 219/137 PS, 125.1; 901/42

[56] References Cited

U.S. PATENT DOCUMENTS

| | | | |
|---|---|---|---|
| 4,390,954 | 6/1983 | Manning | 219/130.5 |
| 4,445,022 | 4/1984 | Mori | 219/130.5 |
| 4,578,562 | 3/1986 | Lindstrom et al. | 219/130.5 |
| 4,825,038 | 4/1989 | Smartt et al. | 219/137 PS |

FOREIGN PATENT DOCUMENTS 60-162580  8/1985  Japan.

*Primary Examiner*—Clifford C. Shaw
*Attorney, Agent, or Firm*—Staas & Halsey

[57] ABSTRACT

A method, such that, using known data, a relationship between a target welding current and a welding current command to be instructed to a welding machine to achieve the target welding current is estimated by a linear formula. Then, a welding current command corresponding to a welding current to be achieved is obtained according to the linear formula, and is actually supplied to the welding machine to carry out a welding operation. An actual welding current is fed back from the welding machine, and this actual welding current and the welding current command associated therewith are stored as one set of data. This process is repeated using different welding current command values, and the resulting sets of data each including the combination of a corresponding welding current command and actual welding current are stored. Based on a plurality of sets of data thus obtained, a linear relational formula, representing the relationship between the actual welding current (target welding current) and the current command, is derived for each of a plurality of welding current ranges.

10 Claims, 4 Drawing Sheets

METHOD OF AUTOMATICALLY ADJUSTING WELDING CONDITIONS FOR AN ARC WELDING ROBOT

TECHNICAL FIELD

The present invention relates to a method of automatically adjusting welding conditions according to which arc welding is carried out by an arc welding robot.

BACKGROUND ART

As shown in FIG. 7, a robot control device 1 outputs a welding voltage command Vc and a welding current command Ic to a welding machine 2. Based on these commands Vc and Ic, a controller 3 of the welding machine 2 operates the welding machine 2 to perform a welding operation.

The feed speed of a wire feeder 4 is determined by a welding current Ir, which is the output current of the welding machine 2. Therefore, control of the feed speed of the wire feeder 4 is performed based on the current command Ic supplied to the welding machine. In arc welding robots, welding conditions for the welding machine are controlled by means of an analog voltage. Therefore, in practice, the current command Ic is given to the controller 3 of the welding machine 2 in the form of a voltage (Vic) corresponding to the command Ic.

Generally, there is no linear relationship between the wire feed speed and actual welding current. In other words, the current command Ic (Vic) and the actual welding current IF have a relationship as indicated by the curve in FIG. 5, and not a linear relationship.

Conventionally, therefore, a current command Ic-actual current IF curve, which represents the relationship as shown in FIG. 5, is divided into a plurality of regions, then the curve segment in each subdivided region is approximated by a linear formula, and the actual welding current Ir (i.e., the feed speed of the wire feeder) for the command welding current Ic is obtained by using the approximate formula. That is, a linear conversion formula for deriving the command current value Ic from a target welding current is prepared for each of the welding current-based regions.

More specifically, a database is constructed beforehand such that it stores welding voltage and current data as welding conditions to be used in a welding environment including the material, diameter, etc., of a welding wire to be used, as well as a linear conversion formula uniquely assigned to the welding current-based region for calculating a current command value to be instructed to the welding machine to achieve a target welding current. The linear conversion formula is set and stored in such a manner that it is finely adjusted in accordance with the shape of a workpiece to be welded, the aiming angle of a torch, etc. During welding, the command welding voltage and the command welding current (wire feed speed command) are supplied to the welding machine in accordance with the data stored in the database.

In a welding operation utilizing such a database as described above, nearly satisfactory welding control is achieved as long as the welding conditions do not greatly deviate from the initial set values. However, in cases where the welding conditions change greatly, for example, where a different workpiece is to be welded, or the welding speed, i.e., the robot moving speed, is changed, the linear conversion formula used till then to convert the target welding current to a command current value is no longer applicable to the new welding conditions. Accordingly, the operator must carry out trial welding a plurality of times according to the new welding conditions, to obtain a new conversion formula. This work causes an inconvenience to the operator and consumes labor.

DISCLOSURE OF THE INVENTION

An object of the present invention is to provide a method of automatically adjusting welding conditions for an arc welding robot, wherein, even when the welding conditions change, a linear conversion formula for obtaining a command current value from a target welding current can be automatically modified according to new welding conditions, by means of feedback values from a welding machine.

To achieve the above object, the present invention comprises the steps of: estimating a relationship between a target welding current and a welding current command to be instructed to a welding machine to achieve the target welding current, by means of a linear formula; obtaining a welding current command value corresponding to a welding current value to be achieved, by using the linear formula, and actually supplying the welding current command value to the welding machine to carry out a welding operation; detecting an actual welding current of the welding machine during the welding operation, and storing the welding current command value supplied during the detection and the actual welding current value as one set of data; supplying another welding current command value different from the first-mentioned welding current command value to the same welding machine to carry out a welding operation, and storing the welding current command value and an actual welding current value as another set of data; and obtaining at least three sets of data each including a combination of the welding current command and the actual welding current, and deriving a linear relational formula representing the relationship between the target welding current and the current command based on the at least three sets of data.

Preferably, a welding current to be supplied to the welding machine is instructed by means of a voltage corresponding thereto, and the linear formula is determined based on voltage values corresponding to maximum and minimum welding currents that can be instructed with respect to the welding machine, and estimated welding current values respectively corresponding to the voltage values.

According to another aspect, the present invention comprises the steps of: estimating a formula representing a relationship between an actual welding current and a welding current command to be instructed to a welding machine to achieve the actual welding current; setting a plurality of target welding currents falling within one of subdivided welding current ranges, and obtaining welding current commands for achieving the target welding currents, respectively, by using the formula; actually supplying each of the obtained welding current commands to the welding machine to carry out a welding operation, and feeding an actual welding current falling within the one of the subdivided welding current ranges back to a control device associated with an arc welding robot when desirable welding operation is performed; and obtaining, by the control device, a linear formula approximating the relationship between the target welding current falling within the one of the subdivided welding current ranges and the welding current command to be instructed to the welding machine to achieve the target welding current as actual welding current, based on a plurality of combinations each including the fed back actual welding current and the command current supplied when the actual welding current is obtained.

Preferably, the welding current command is supplied as an analog voltage to the welding machine, and the formula estimated as above is a linear formula derived based on maximum and minimum voltage values of predetermined welding current commands that can be instructed with respect to the welding machine, and maximum and minimum welding current values estimated with respect to the maximum and minimum voltage values, respectively.

Still preferably, the welding current command is supplied as an analog voltage to the welding machine, the actual welding current of the welding machine is fed back as an analog voltage to the control device associated with the arc welding robot and converted to an actual welding current value in the control device, and in the step of obtaining the linear formula, the linear formula is derived by a least squares method, based on at least three fed back actual welding current values falling within an identical welding current range and voltage values of the current commands supplied when the respective three actual welding current values are obtained.

As described above, according to the present invention, a linear conversion formula for obtaining a command current value from a target welding current can be automatically derived by merely giving welding conditions such as a welding current command to the welding machine to cause the machine to carry out trial welding, thus eliminating complicated work to be done by the operator, such as adjustment and resetting of the conversion formula. That is, the number of times the trial welding must be executed is reduced, and the operator's labor associated with the resetting can be greatly reduced. Further, since the linear conversion formulas derived during welding work in various welding environments can be stored up in the form of a database, they can be referred to later when commands for welding work are created.

BEST MODE OF CARRYING OUT THE INVENTION

To obtain target welding voltage and current, a welding voltage command and a welding current command are given to a welding machine as welding conditions. In practice, the welding current command is supplied to the welding machine in the form of a voltage (hereinafter referred to as the "welding current command voltage") corresponding to the current command. This is because all welding conditions for an arc welding robot are controlled by means of analog voltage.

Figure 5:
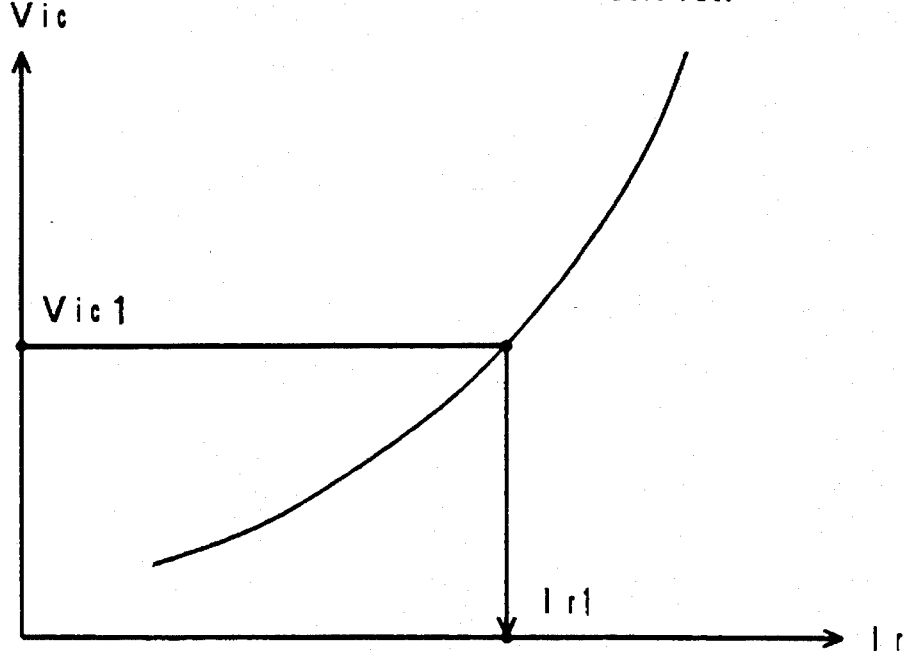
FIG. 5 is a diagram illustrating the relationship between an actual welding current and an actual command value (welding current command voltage) for achieving the actual welding current.

The relationship between an actual welding current $Ir$ and welding current command voltage $Vic$ given to the welding machine from a robot control device is nonlinear, as shown in FIG. 5. Therefore, the welding current command voltage $Vic$ fop achieving a target welding current (actual welding current $Ir$) cannot be obtained by applying a single linear formula to the target welding current.

If, however, a plurality of magnitude-based ranges is set for the welding current $Ir$ to be outputted from the welding machine, then the relationship between the welding current $Ir$ and the current command voltage $Vic$ in each such range can be approximated by a single linear relationship. Accordingly, for a target welding current $Io$ falling within a certain range, the relationship between the target welding current $Io$ and a current command voltage $Vic$ for achieving the target welding current $Io$ (that is, as actual welding current $Ir$) can be expressed as a linear formula as follows:

$$Vic = a \cdot Io + b \qquad (1)$$

In this equation, a and b are coefficients applied to the specific range within which the welding current $Io$ falls, and generally need to be adjusted in accordance with the aiming angle of a torch, the shape of a workpiece to be welded, etc. Where the target welding current $Io$ falls within another range, the coefficients a and b in equation (1) have respective different values.

Figure 4:
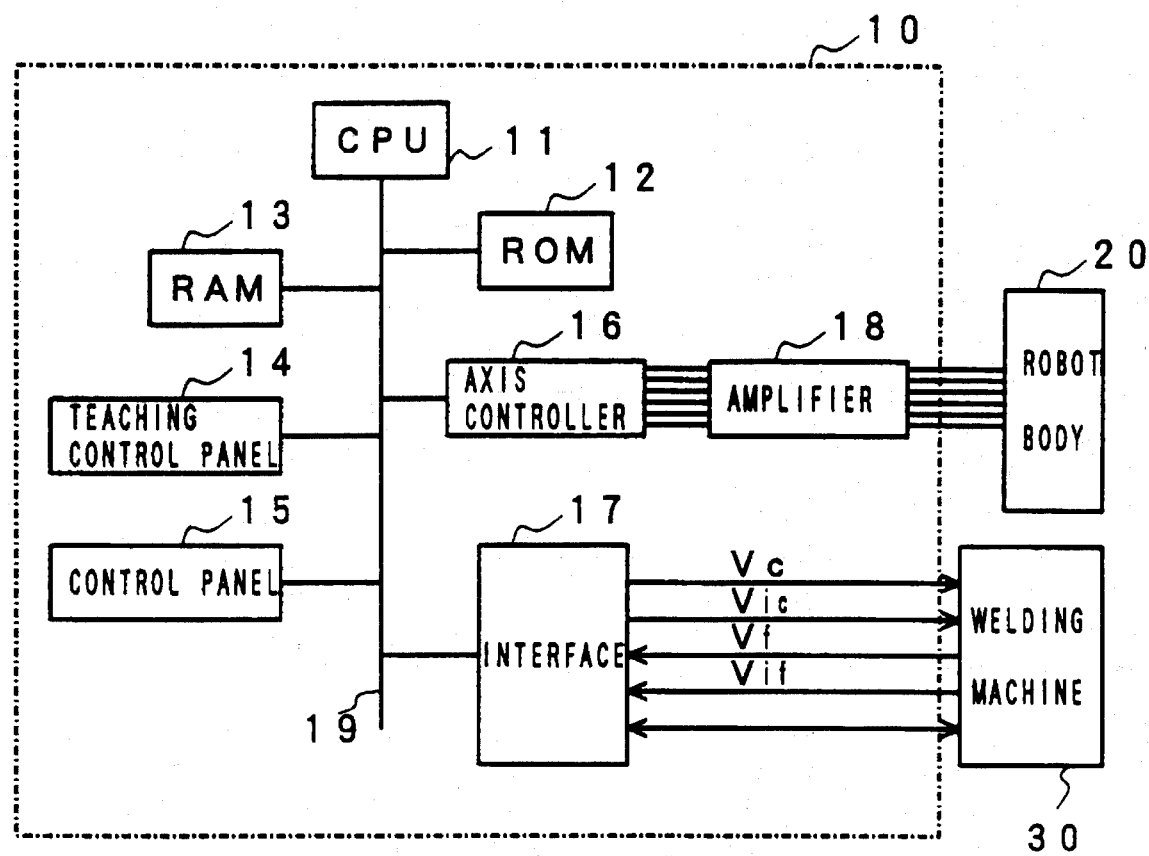
FIG. 4 is a block diagram of a control system of an arc welding robot fop carrying out the embodiment of the present invention.

Actual welding voltage $Vr$ and actual welding current value $Ir$ are outputted from the welding machine. In practice, the actual welding current $Ir$ is not fed back as it is, but is fed back to the robot control device after being converted to a corresponding voltage value $Vif$, as shown in FIG. 4. To convert the voltage value $Vif$ to actual welding current value $Ir$, equation (2) below is used:

$$Ir = c \cdot Vif + d \qquad (2)$$

Coefficients c and d in equation (2) are values specific to the welding machine and are uniquely determined when the welding machine to be used is specified.

According to the present invention, the welding machine is operated to carry out trial welding, the actual welding current $Ir$ is calculated from the voltage value $Vif$ corresponding to the actual welding current value $Ir$ fed back from the operating machine according to the aforementioned equation (2), the relationship between the actual welding current $Ir$ and the welding current command voltage $Vic$ instructed when this actual welding current $Ir$ is outputted is derived for each of the welding current ($Ir$)-based ranges, to thereby obtain a linear relational formula representing the relationship between the target welding current $Io$ and the welding current command voltage $Vic$ for achieving the target welding current $Io$ as actual welding current $Ir$, for each of the welding current ranges. In other words, the robot control device automatically determines the coefficients a and b in the aforementioned equation (1) for each of the welding current ranges, by carrying out trial welding using the welding machine, and employing the voltage value $Vif$ fed back from the welding machine and corresponding to the actual welding current $Ir$.

FIG. 4 is a block diagram of a control system of an arc welding robot to which the present invention is applied. A robot control device 10 includes a processor 11, which is connected via a bus 19 to a ROM 12 for storing control programs, a RAM 13 for temporarily storing a welding program specifying a travel path of a robot, welding commands, etc., and various data, a teaching control panel 14 for teaching a program to the robot and permitting entry of various commands, a control panel 15, an axis controller 16 for controlling individual robot axes, and an interface 17. The axis controller 16 is connected to a servo amplifier 18 for driving servomotors associated with the respective axes of a robot body 20.

A welding machine 30 is connected to the robot control 10 device via the interface 17. A welding voltage command Vc and a welding current command voltage Vic, each in the form of an analog voltage, are output from the robot control device 10 to the welding machine 30. On the other hand, a welding voltage feedback value Vf and a voltage Vif corresponding to a detected welding current, each in the form of an analog voltage, are fed back from the welding machine 30 to the robot control device 10. Further, other control signals are transferred between the robot control device 10 and the welding machine 30. The welding machine 30 has a welding torch attached to a wrist provided at a distal end of an arm of the robot body 20, and the torch moves along a taught path when the robot is operated. The interface 17 includes a D/A converter for converting digital signals to analog signals, and an A/D converter for converting analog signals to digital signals.

The arrangement of the arc welding robot described above is identical to that of a conventional arc welding robot; therefore, a detailed description thereof is omitted.

Figure 1:
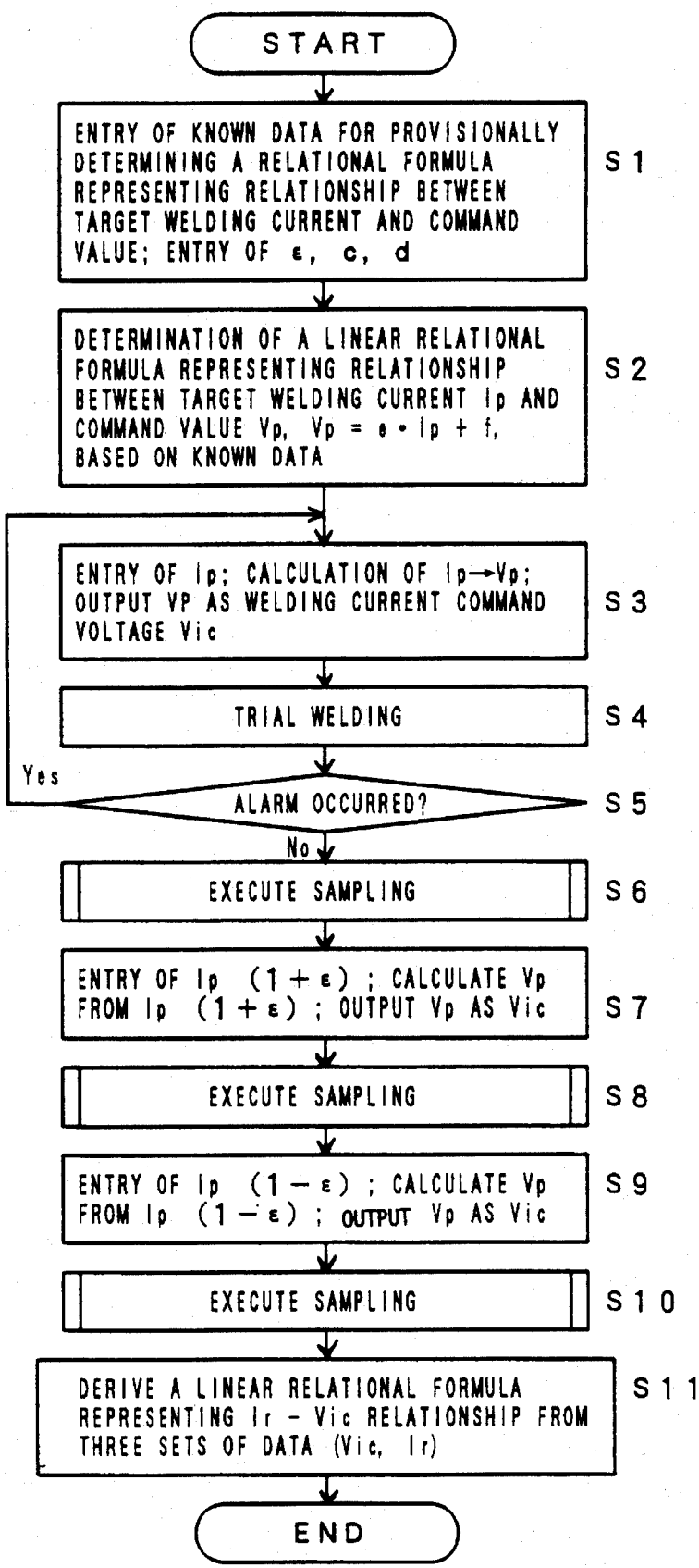
FIG. 1 is a flowchart of a welding condition adjusting process according to an embodiment of the present invention.
Figure 2:
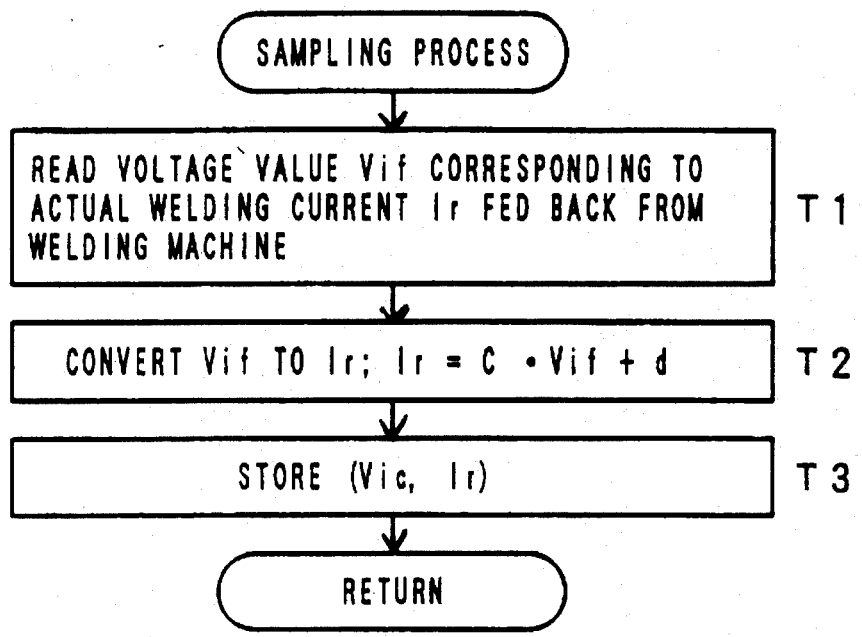
FIG. 2 is a flowchart of a sampling process according to the embodiment.

An automatic adjusting method for welding conditions, according to an embodiment of the present invention, will be now described with reference to FIGS. 1 and 2. FIGS. 1 and 2 are flowcharts of processes executed when the robot control device 10 is set in an automatic welding condition adjusting mode.

First, the robot control device 10 is set in the automatic welding condition adjusting mode, and a voltage Vmax corresponding to a maximum welding current command that can be instructed to the welding machine 30, a voltage Vmin corresponding to a minimum welding current command, and estimated welding current values Imax and Imin that will flow when the maximum voltage Vmax and the minimum voltage Vmin, respectively, are specified as welding current commands, are inputted to the control device 10. These values, i.e., the maximum and minimum voltages Vmax and Vmin, and the estimated maximum and minimum currents Imax and Imin, are usually obtained in advance for each welding machine by experiments and thus are known. Also, the aforementioned formula (2) and the value of $\epsilon$, mentioned later, are entered (Step S1).

Figure 3:
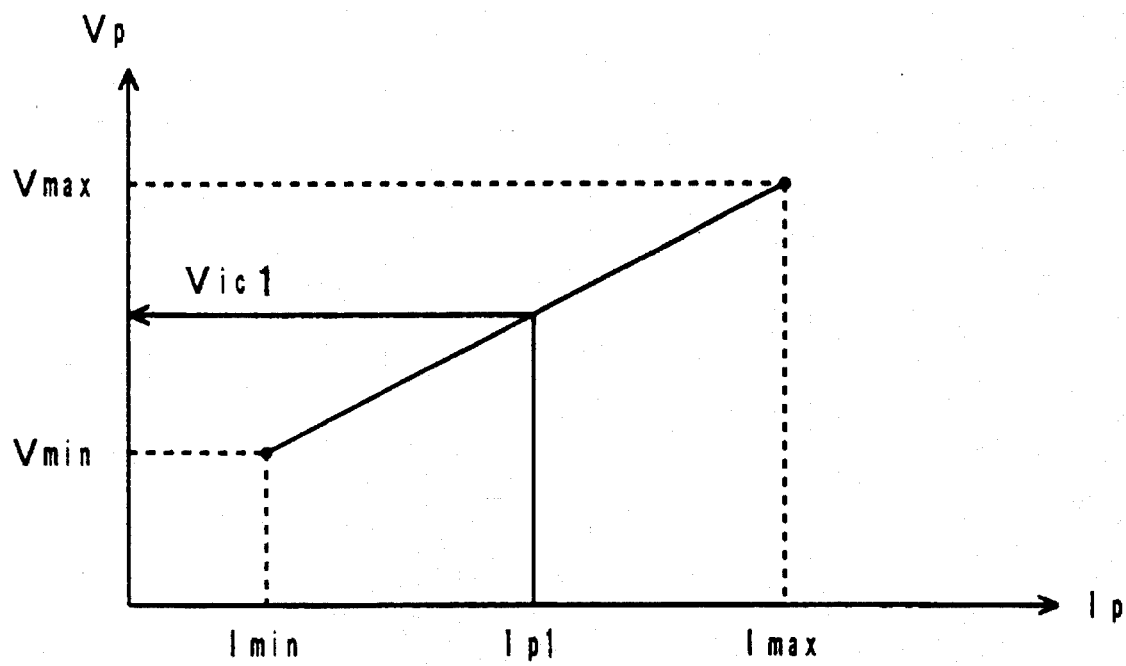
FIG. 3 is a diagram illustrating how the relationship between a target welding current and a command value (welding current command voltage) for achieving the target welding current is estimated based on a linear formula.

On reading the input data, the processor 11 of the robot control device 10 determines the relationship between an estimated welding current Ip and a welding current command voltage Vp in the form of a straight line connecting points (Imax, Vmax) and (Imin, Vmin) in a rectangular Ip-Vp coordinate system, as shown in FIG. 3, on the basis of the read data (Step S2).

Provided the straight line in FIG. 3 is given by the following equation:

$$Vp = e \cdot Ip + f \quad (3)$$

coefficients e and f can be derived as follows:

$$e = (Vmax - Vmin)/(Imax - Imin)$$

$$f = Vmin - e \cdot Imin$$

The straight line in the rectangular coordinate system of FIG. 3, indicated along a horizontal axis Ip (estimated welding current) and a vertical axis Vp (welding current command voltage), is provisionally set based on the known data as a substitute for the curve in the rectangular coordinate system of FIG. 5, indicated along a horizontal axis Ir (actual welding current) and a vertical axis Vic (welding current command voltage), since the curve is not known at this stage.

Subsequently, a welding voltage command Vc and a target welding current Io1, as welding conditions for trial welding by means of the welding machine 30, are input from the control panel 15 to the robot control device 10. The processor 11 of the robot control device 10 substitutes the input value Io1 for the variable Ip in equation (3), to obtain a welding current command voltage Vp=Vic1 corresponding to an estimated welding current Ip=Ip1 (see FIG. 3). The welding current command voltage Vic1 and the welding voltage command Vc are then actually supplied to the welding machine 30 (Step S3). Thus, the processor 11 actuates the robot in accordance with a trial welding program taught thereto, and the welding machine 30 carries out welding operation in accordance with the welding voltage command Vc and welding current command voltage Vci1 supplied thereto (Step S4).

If no arc is generated when the welding machine is operated according to the thus-instructed welding conditions, an alarm is supplied to the robot control device (Step S5). On receiving the alarm signal, the robot control device 10 displays a message, etc., requesting modification of the welding conditions, at the display device of the teaching control panel 14 or the like (omitted from FIG. 1), and waits for the entry of new welding conditions. When new conditions are entered, the flow returns to Step S3 and welding operation is carried out according to the new conditions.

If an arc is properly generated as a result of trial welding operation by the welding machine 30 according to the instructed conditions, and thus no alarm is generated, a sampling process shown in FIG. 2 is executed (Step S6).

In the sampling process, a voltage Vif=Vif1 corresponding to the welding current fed back from the welding machine 30, which is carrying out trial welding, is read (Step T1), and an actual welding current Ir1 is obtained based on the voltage Vif1, by using the preset equation (2) for converting the voltage (corresponding to the welding current) to the welding current (Step T2). The welding current command voltage Vic1 actually instructed to the welding machine 30 and the obtained actual welding current Ir1 are stored in the RAM as one set of data (Vic1, Ir1) (Step T3; see FIG. 5), and the flow returns to the main routine of FIG. 1.

Then, the target welding current is set to a value Io2 which is greater than the value Io1 used in Step S6 by a predetermined amount. In this embodiment, Io2 is defined as Io2 = Io1·(1+$\epsilon$), where $\epsilon$ is a preset value and about 0.1. After determining the target welding current Io2 in this manner, the processor 11 of the robot control device 10 substitutes the value Io2 for the variable Ip in equation (3), to obtain a welding current command voltage Vp=Vic2 for achieving the target welding current Io2 (estimated welding current Ip2). The voltage command Vc and the welding current command voltage Vic2 are actually supplied to the welding machine 30, which then carries out a welding operation according to the thus-set welding conditions (Step S7).

While welding is performed by the welding machine 30, the processor 11 of the robot control device 10 executes the aforementioned sampling process shown in FIG. 2 (Step S8). That is, a voltage Vif2 corresponding to the welding current fed back from the welding machine 30 is read, an actual welding current Ir2 is obtained according to the preset equation (2) for converting the voltage (corresponding to the welding current) to a welding current, the welding current command voltage Vic2 actually instructed to the welding machine 30 and the obtained actual welding current Ir2 are stored in the RAM as one set of data (Vic2, Ir2) (Steps T1–T3), and the flow returns to the main routine of FIG. 1.

Subsequently, the target welding current is set to a value Io3 which is smaller than the value Io1 used in Step S6 by a predetermined amount. In this embodiment, Io3 is defined as $Io3 = Io1 \cdot (1-\epsilon)$. After determining the target welding current Io3 in this manner, the processor 11 of the robot control device 10 calculates a welding current command voltage Vp=Vic3 for achieving the target welding current Io3, according to equation (3) in the same manner as described above, and supplies the welding current command voltage Vic3, along with the voltage command Vc, to the welding machine 30, to actually operate the welding machine 30 according to the thus-set welding conditions (Step S9). Then, a voltage Vif3 corresponding to the welding current fed back from the welding machine 30 is read, an actual welding current Ir3 is obtained based on the voltage Vif3 in the same manner as described above, the welding current command voltage Vic3 actually instructed to the welding machine 30 and the obtained actual welding current Ir3 are stored in the RAM as one set of data (Vic3, Ir3) (Steps T1–T3), and the flow returns to the main routine of FIG. 1.

Figure 6:
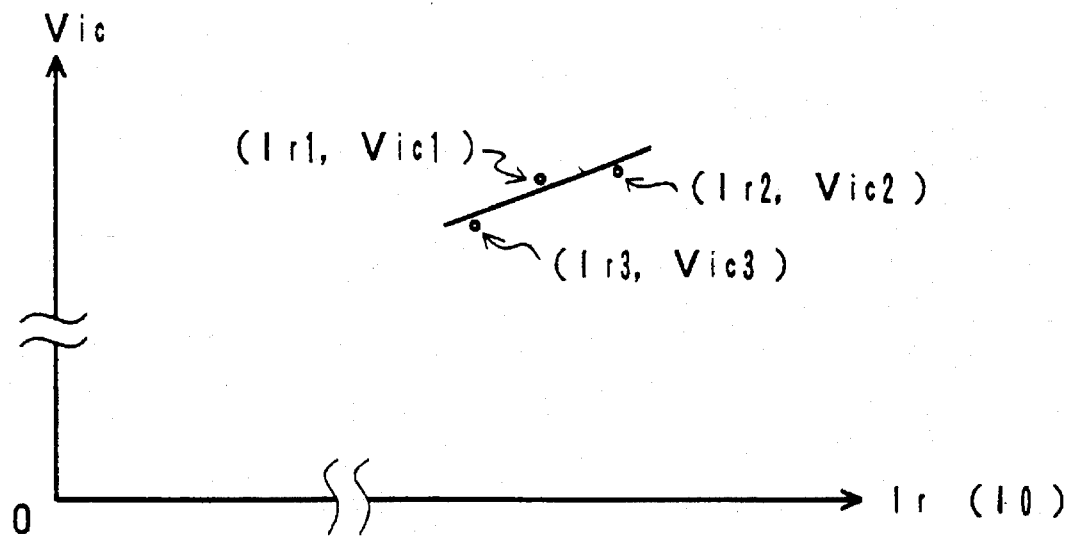
FIG. 6 is a diagram illustrating how a linear formula indicating the relationship between target welding current and welding current command voltage is derived from data representing the relationship between an actual welding current and an actually instructed welding current command voltage.
Figure 7:
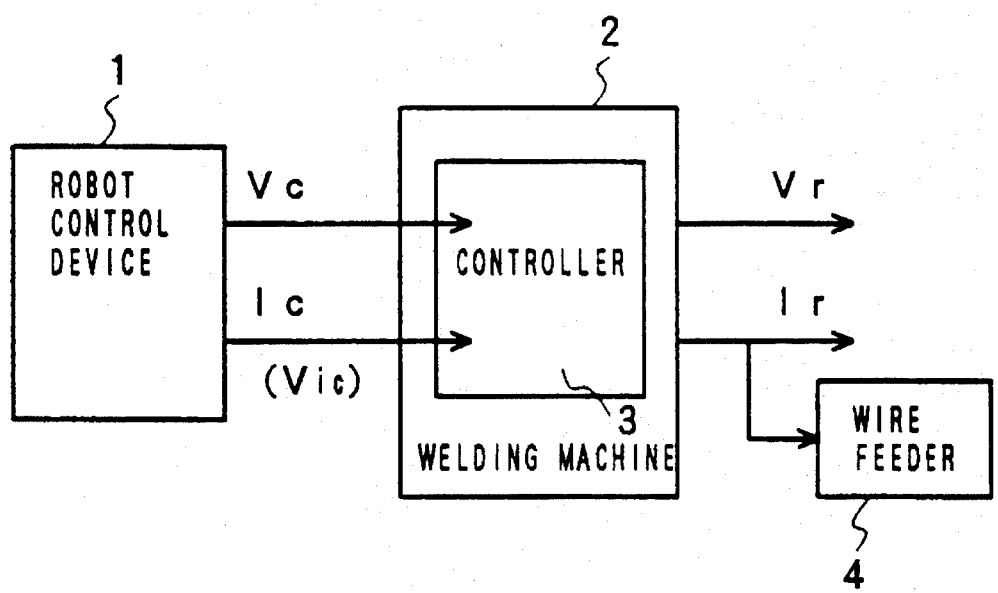
FIG. 7 is a block diagram of a control system of a conventional arc welding robot.

Based on the thus-obtained three sets of data each including the combination of welding current command voltage Vic and actual welding current Ir, a linear equation (i.e., the coefficients a and b in equation (1)), by which the target welding current Io is converted to the welding current command voltage Vic for achieving the target welding current Io as actual welding current (Io=Ir), is obtained by the least squares method, as shown in FIG. 6. The obtained linear equation is stored, and the automatic welding condition adjusting process for one welding current-based range is ended.

We claim:

1. A method of automatically adjusting welding conditions for an arc welding robot, comprising the steps of:

a) estimating a relationship between a target welding current and a welding current command to be instructed to a welding machine to achieve the target welding current, by means of a linear formula;

b) obtaining a welding current command value corresponding to a welding current value to be achieved, by using the linear formula, and actually supplying the first welding current command value to the welding machine to carry out a welding operation;

c) detecting an actual welding current of the welding machine during the welding operation, and storing the first welding current command value supplied during the detection and the actual welding current value as one set of data;

d) supplying another welding current command value different from the welding current command value obtained in said step b) to the welding machine to carry out a second welding operation, and storing another welding current command value and another actual welding current value as another set of data;

obtaining at least three sets of data, each including a combination of the welding current command and the actual welding current, and deriving a new linear relational formula representing a relationship between the target welding current and the current command based on said at least three sets of data;

using the new linear relational formula to determine a new welding current command for a new target welding current.

2. The method according to claim 1, wherein the actual welding current to be supplied to the welding machine is instructed by means of a voltage corresponding thereto, and the linear formula is determined based on voltage values corresponding to maximum and minimum welding currents that can be instructed to the welding machine, and estimated welding current values respectively corresponding to said voltage values.

3. A method of automatically adjusting welding conditions for an arc welding robot, comprising the steps of:

a) estimating a formula representing a relationship between an actual welding current and a welding current command to be instructed to a welding machine to achieve the actual welding current;

b) setting a plurality of target welding currents falling within one of subdivided welding current ranges, and obtaining welding current commands for achieving the target welding currents, respectively, by using the formula;

c) actually supplying each of the obtained welding current commands to the welding machine to carry out a welding operation, and feeding the actual welding current falling within said one of the subdivided welding current ranges back to a control device associated with the arc welding robot when a desirable welding operation is performed;

d) obtaining, by the control device, a linear formula approximating the relationship between the target welding current falling within said one of the subdivided welding current ranges and the welding current command to be instructed to the welding machine to achieve the target welding current as the actual welding current, based on a plurality of combinations each including the fed back actual welding current and the command current supplied when the actual welding current is obtained; and supplying the welding current command determined in said step d) to the welding machine to achieve the target welding current falling within said one of the subdivided welding current ranges.

4. The method according to claim 3, wherein each welding current command is supplied as an analog voltage to the welding machine, and the formula estimated in said step a) is a linear formula derived based on maximum and minimum voltage values of predetermined welding current commands that can be instructed to the welding machine, and maximum and minimum welding current values estimated to result from said maximum and minimum voltage values, respectively.

5. The method according to claim 3, wherein each welding current command is supplied as an analog voltage to the welding machine, each actual welding current of the welding machine is fed back as an analog voltage to the control device associated with the arc welding robot and converted to an actual welding current value in the control device, and in said step d), the linear formula is derived by a least squared method, based on at least three fed back actual welding current values falling within an identical welding current range and voltage values of the current commands supplied in response to the respective three actual welding current values.

6. The method according to claim 4, wherein each welding current command is supplied as an analog voltage to the welding machine, each actual welding current of the welding machine is fed back as an analog voltage to the control device associated with the arc welding robot and converted to an actual welding current value in the control device, and in said step d), the linear formula is derived by a least squared method, based on at least three fed back actual welding current values falling within an identical welding current range and voltage values of the current commands supplied in response to the respective three actual welding current values.

7. A method of determining a linear relational formula between a target welding current and a welding current command for an arc welding robot, said method comprising the steps of:

a) estimating a relationship between a target welding current and a welding current command to be instructed to a welding machine to achieve the target welding current, by means of a linear formula;

b) obtaining a welding current command value corresponding to a welding current value to be achieved, by using the linear formula, and actually supplying the first welding current command value to the welding machine to carry out a welding operation;

c) detecting an actual welding current of the welding machine during the welding operation, and storing the first welding current command value supplied during the detection and the actual welding current value as one set of data;

d) supplying another welding current command value different from the welding current command value obtained in said step b) to the welding machine to carry out a second welding operation, and storing another welding current command value and another actual welding current value as another set of data; and obtaining at least three sets of data, each including a combination of the welding current command and the actual welding current, and deriving a new linear relational formula representing a relationship between the target welding current and the current command based on said at least three sets of data.

8. The method according to claim 7, wherein the actual welding current to be supplied to the welding machine is instructed by means of a voltage corresponding thereto, and the linear formula is determined based on voltage values corresponding to maximum and minimum welding currents that can be instructed to the welding machine, and estimated welding current values respectively corresponding to said voltage values.

9. A method of determining a linear relational formula between a target welding current and a welding current command for an arc welding robot, said method comprising the steps of:

a) estimating a formula representing a relationship between an actual welding current and a welding current command to be instructed to a welding machine to achieve the actual welding current;

b) setting a plurality of target welding currents falling within one of subdivided welding current ranges, and obtaining welding current commands for achieving the target welding currents, respectively, by using the formula;

c) actually supplying each of the obtained welding current commands to the welding machine to carry out a welding operation, and feeding the actual welding current falling within said one of the subdivided welding current ranges back to a control device associated with the arc welding robot when a desirable welding operation is performed; and d) obtaining, by the control device, a linear formula approximating the relationship between the target welding current falling within said one of the subdivided welding current ranges and the welding current command to be instructed to the welding machine to achieve the target welding current as the actual welding current, based on a plurality of combinations each including the fed back actual welding current and the command current supplied when the actual welding current is obtained.

10. The method according to claim 9, wherein each welding current command is supplied as an analog voltage to the welding machine, and the formula estimated in said step a) is a linear formula derived based on maximum and minimum voltage values of predetermined welding current commands that can be instructed to the welding machine, and maximum and minimum welding current values estimated to result from said maximum and minimum voltage values, respectively.

* * * * *

UNITED STATES PATENT AND TRADEMARK OFFICE
CERTIFICATE OF CORRECTION

PATENT NO. : 5,528,013
DATED : June 18, 1996
INVENTOR(S) : Hirotsugu KAIHORI et al It is certified that error appears in the above-indentified patent and that said Letters Patent is hereby corrected as shown below:

Column 1, lines 30 and 34, delete "IF" and insert therefor --Ir--.

Column 4, line 12, delete "fop" and insert therefor --for--.

Column 9, line 7, delete "4" and insert therefor --3--.

Signed and Sealed this

Tenth Day of September, 1996

Attest:

BRUCE LEHMAN

Attesting Officer

Commissioner of Patents and Trademarks